US009326214B1

United States Patent
Park et al.

(10) Patent No.: US 9,326,214 B1
(45) Date of Patent: Apr. 26, 2016

(54) MANAGING A HANDOVER OF A WIRELESS DEVICE

(71) Applicant: Sprint Spectrum LP, Overland Park, KS (US)

(72) Inventors: Sungki Park, Ashburn, VA (US); Chunmei Liu, Great Falls, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 258 days.

(21) Appl. No.: 13/857,054

(22) Filed: Apr. 4, 2013

(51) Int. Cl.
*H04W 36/34* (2009.01)
*H04W 36/24* (2009.01)
*H04W 36/16* (2009.01)

(52) U.S. Cl.
CPC .............. *H04W 36/34* (2013.01); *H04W 36/24* (2013.01); *H04W 36/165* (2013.01)

(58) Field of Classification Search
CPC .......... H04W 52/143; H04W 72/0446; H04W 72/082; H04L 5/0062; H04L 5/0094
USPC ......................... 370/331, 332; 455/444, 452.2
See application file for complete search history.

(56) References Cited

U.S. PATENT DOCUMENTS

| 5,379,446 A * | 1/1995 | Murase ................. H04W 36/30 455/444 |
| 5,457,810 A * | 10/1995 | Ivanov .................. H04W 36/04 455/441 |
| 6,181,943 B1* | 1/2001 | Kuo et al. ...................... 455/437 |
| 6,252,861 B1* | 6/2001 | Bernstein .............. H04W 36/30 370/331 |
| 8,620,324 B2* | 12/2013 | Jeong .................... H04W 36/30 370/331 |
| 8,644,207 B1* | 2/2014 | Vivanco et al. ............... 370/312 |
| 8,804,670 B1* | 8/2014 | Talley .................... H04W 76/00 370/331 |
| 2002/0027890 A1* | 3/2002 | Bernstein .............. H04W 36/30 370/331 |
| 2010/0093358 A1* | 4/2010 | Cheong ............. H04W 36/0055 455/444 |
| 2014/0031045 A1* | 1/2014 | Kosseifi et al. ............... 455/440 |

* cited by examiner

Primary Examiner — Andrew Lai
Assistant Examiner — Jamaal Henson (57) ABSTRACT

In systems and methods of managing a handover of a wireless device, it is determined that a modulation and coding scheme (MCS) assigned to a wireless device operating on a first frequency band meets an MCS threshold. An instruction is sent to the wireless device to determine a signal level of a second frequency band when the MCS meets the MCS threshold. When the signal level of the second frequency band meets a signal level threshold, a handover is performed of the wireless device from the first frequency band to the second frequency band.

16 Claims, 5 Drawing Sheets

MANAGING A HANDOVER OF A WIRELESS DEVICE

TECHNICAL BACKGROUND

An access node and a wireless device can communicate over one or more frequency bands. Due to propagation characteristics of the frequency bands, lower frequency bands tends to propagate a greater distance from access node than higher frequency bands, and further, as a wireless device moves away from the access node the signal level of the higher frequency bands falls off more rapidly than the lower frequency bands.

When the wireless device moves into the coverage area of a higher frequency band, a handover can be performed to instruct the wireless device to communicate over the higher frequency band when a signal level of the higher frequency band meets a threshold signal level. However, in order to accurately determine that the signal level of the higher frequency band meets the threshold signal level, the wireless device may perform frequent scanning of higher frequency band, which can reduce a data rate or a data throughput between the access node and the wireless device due at least in part to the frequent measurement periods assigned to the wireless device.

Overview

In an embodiment, it is determined that a modulation and coding scheme (MCS) assigned to a wireless device operating on a first frequency band meets an MCS threshold. An instruction is sent to the wireless device to determine a signal level of a second frequency band when the MCS meets the MCS threshold. When the signal level of the second frequency band meets a signal level threshold, a handover is performed of the wireless device from the first frequency band to the second frequency band.

DETAILED DESCRIPTION

Figure 1A:
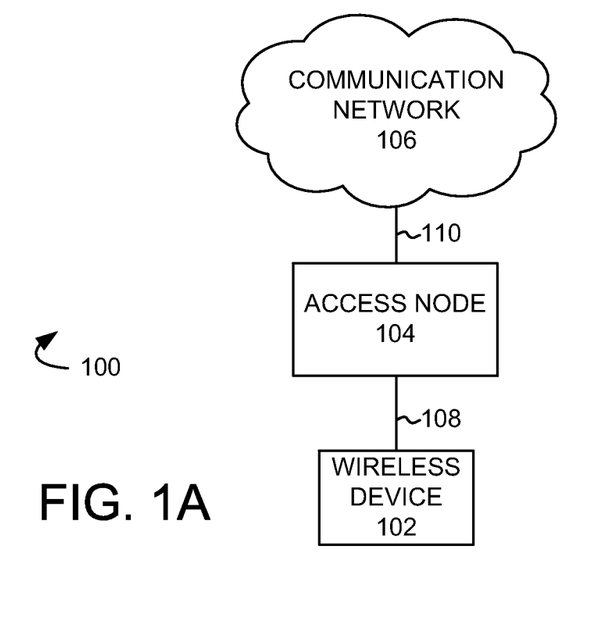
FIG. 1A illustrates an exemplary communication system to manage a handover of a wireless device.

FIG. 1A illustrates an exemplary communication system 100 to manage a handover of a wireless device comprising wireless device 102, access node 104, and communication network 106. Examples of wireless device 102 can include a cell phone, a smart phone, a computing platform such as a laptop, palmtop, or tablet, a personal digital assistant, or an internet access device, including combinations thereof. Wireless device 102 is in communication with access node 104 over communication link 108.

Access node 104 is a network node capable of providing wireless communications to wireless device 102, and can be, for example, a base transceiver station, a radio base station, an eNodeB device, or an enhanced eNodeB device. Access node 104 is in communication with communication network 106 over communication link 110. Access node 104 and wireless device 102 can communicate over one or more frequency bands or carrier bands. For example, referring to FIG. 1B, access node 104 can utilize a lower frequency band 112 and a higher frequency band 114. Due to propagation characteristics of the frequency bands, lower frequency band 112 tends to propagate a greater distance from access node 104 than higher frequency band 114, and wireless device 102 typically can detect a greater signal level of lower frequency band 112 than of higher frequency band 114, particularly as wireless device 102 moves away from access node 104.

Returning to FIG. 1A, communication network 106 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 106 may also comprise base stations, wireless communication nodes, telephony switches, internet routers, network gateways, computer systems, communication links, or some other type of communication equipment, and combinations thereof. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 106 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 108 and 110 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 104 and communication network 106 which are omitted for clarity, including additional processing nodes, routers, gateways, and physical and/or wireless data links for carrying data among the various network elements.

In operation, it is determined that a modulation and coding scheme (MCS) assigned to wireless device 102 operating on a first frequency band meets an MCS threshold. Wireless device 102 is sent an instruction, for example, by access node 104, to determine a signal level of a second frequency band of access node 104 when the MCS meets the MCS threshold. When the signal level of the second frequency band meets a signal level threshold, a handover is performed of wireless device 102 to instruct wireless device 102 to change from communicating over the first frequency band to the second frequency band. In an embodiment, sending an instruction can further comprise instructing wireless device 102 to determine signal level of a second frequency band when the MCS meets the MCS threshold during a first time period. In an embodiment, during a second time period wireless device 102 may not determine the signal level of the second frequency band.

Figure 1B:
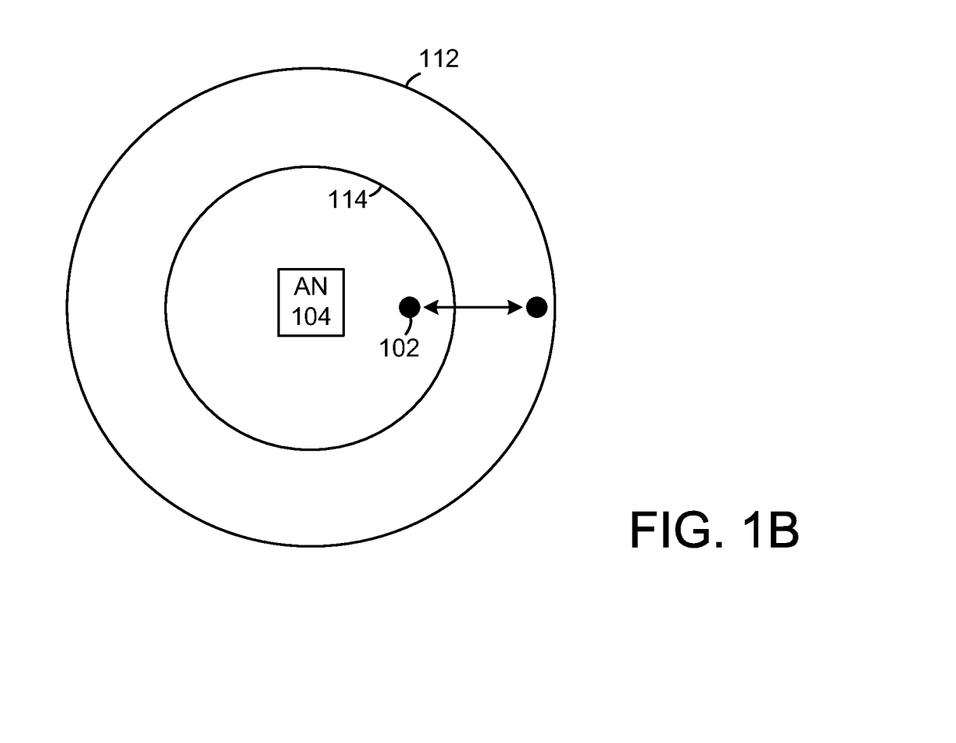
FIG. 1B illustrates exemplary frequency band coverage in a communication system.
Figure 2:
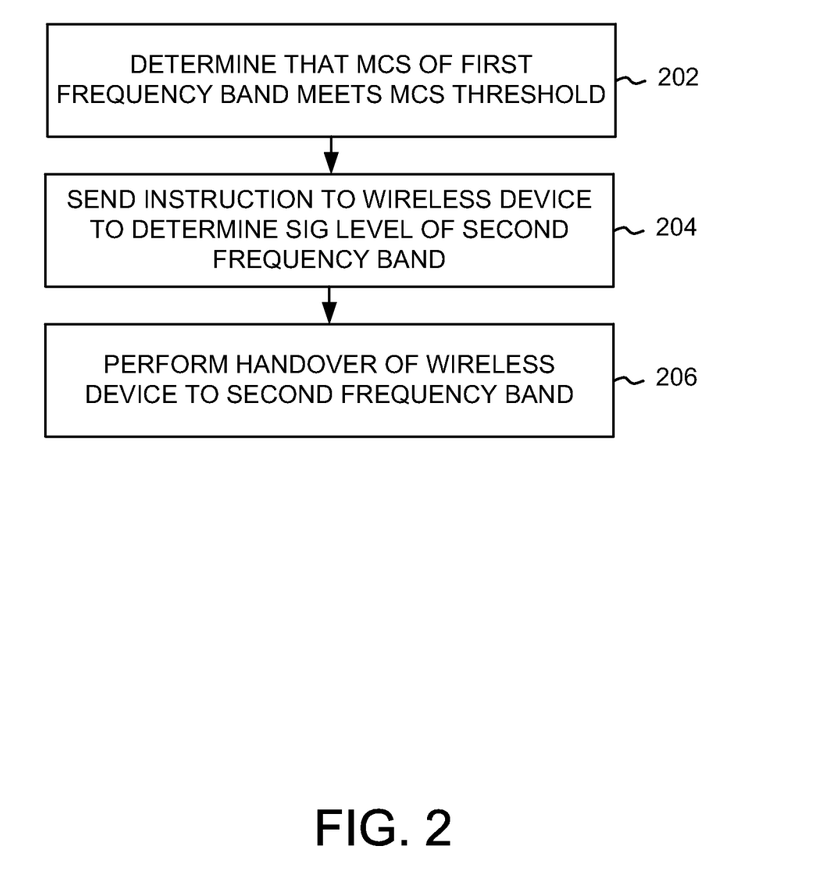
FIG. 2 illustrates an exemplary method of managing a handover of a wireless device.

FIG. 2 illustrates an exemplary method of managing a handover of a wireless device. In operation 202, it is determined that a modulation and coding scheme (MCS) assigned to a wireless device operating on a first frequency band meets an MCS threshold. For example, when wireless device 102, which is communicating over higher frequency band 114, moves beyond a coverage area of higher frequency band 114 but remains within a coverage area of lower frequency band 112, typically a handover is performed to instruct wireless device 102 to communicate over lower frequency band 112. The performance of the handover can be triggered, for example, when a signal level of the higher frequency band drops to meet a threshold signal level, or when a signal level of the lower frequency band is greater than a signal level of the higher frequency band by a threshold amount, and the like.

Access node 104 may assign an MCS to the communication between access node 104 and wireless device 102. Examples of an MCS include 64QAM (quadrature amplitude modulation), 16QAM, QPSK (quadrature phase shift keying), and other similar carrier modulation techniques. Each MCS varies in the amount of new information and redundant information transmitted per unit time. The assigned MCS may correlate with a distance of wireless device 102 from access node 104. For example, within a coverage area of a frequency band, an MCS of 64QAM may be used when wireless device 102 is relatively close to access node 104, an MCS of 16QAM may be used when wireless device 102 is further away from access node 104, and an MCS of QPSK may be when wireless device 102 is closer to the edge of the coverage area of the frequency band. In an embodiment, an MCS of 16QAM assigned when wireless device 102 is communicating over lower frequency band 112, may indicate that wireless device 102 is relatively close to an edge of a coverage area of higher frequency 114. An MCS may be assigned by access node 104, or an MCS may be requested by wireless device 102. In an embodiment, wireless device 102 may report an assigned MCS to access node 104.

In operation 204, an instruction is sent to the wireless device to determine a signal level of a second frequency band when the MCS meets the MCS threshold. For example, an MCS assigned to communications between wireless device 102 and access node 104 can be 16QAM, and an MCS of at least 16QAM can be set as an MCS threshold. For example, as wireless device 102 moves within the coverage area of lower frequency band 112 toward an edge of the coverage area of higher frequency band 114, an MCS assigned to the communication between wireless device 102 and access node 104 can be monitored. In an embodiment, the assigned MCS can be monitored based on the what MCS access node 104 assigns to the communication between wireless device 102 and access node 104. In an embodiment, the assigned MCS can be monitored based on an indicator provided by wireless device 102, such as a signal level indicator, a signal quality indicator, and the like. For example, wireless device 102 can provide to access node 104 a carrier quality indicator (CQI) or similar indicator of received signal quality. The indicator can be based on, for example, a signal-to-noise ratio (SNR), signal-to-interference plus noise ratio (SINR), signal-to-noise plus distortion ratio (SNDR), and so forth of high frequency band 112, which can be used to compute the indicator for the higher frequency band. The CQI for a given channel can also be based on the MCS assigned to the communication between wireless device 102 and access node 104.

When wireless device 102 is communicating over frequency band 112 and moves into the coverage area of higher frequency band 114, it may be determined to perform a handover to instruct wireless device 102 to communicate over higher frequency band 114, for example, for load balancing purposes, or to preserve communication link resources of lower frequency band 112, or to provide a higher data throughput to wireless device 102, or for another reason. The handover may be performed when a signal level of higher frequency band 114 meets a threshold signal level. However, in order to accurately determine that the signal level of frequency band 114 meets the threshold signal level, wireless device 102 may perform frequent scanning of higher frequency band 114. Measurement periods can be assigned to wireless device 102 (or wireless device 102 can determine measurement periods) during which the scanning is performed, and during which other data (such as application data) is not sent to or received by wireless device 102. Frequent scanning of higher frequency band 114 can reduce a data rate or a data throughput between access node 104 and wireless device 102 due at least in part to the frequent measurement periods assigned to wireless device 102, in which data is not sent to or received by wireless device 102. Further, frequent scanning of higher frequency band 114 can reduce battery power or another power storage of wireless device 102.

In an embodiment, wireless device 102 can be instructed to determine signal level of a second frequency band when the MCS meets the MCS threshold during a first time period. Further, wireless device 102 can be instructed to not determine the signal level of the second carrier during a second time period. For example, wireless device 102 can be instructed to use a particular measurement gap or other time period during which wireless device 102 may scan higher frequency band 114. During the measurement gap wireless device 102 can scan higher frequency band 114, and following the duration of the measurement gap wireless device 102 may not scan higher frequency band 114. In other words, wireless device 102 can be instructed to scan higher frequency band 114 during a first time period, and can be instructed to not scan higher frequency band 114 during a second time period.

In operation 206, a handover is performed of the wireless device from the first frequency band to the second frequency band when the signal level of the second frequency band meets a signal level threshold. For example, the second signal level can comprise a signal strength level or a signal quality level, such as a carrier quality indicator (CQI) or similar indicator of received signal quality, a signal-to-noise ratio (SNR), signal-to-interference plus noise ratio (SINR), signal-to-noise plus distortion ratio (SNDR), and the like. When the signal level of the second frequency band meets a signal level threshold, a handover can be performed of the wireless device from the first frequency band to the second frequency band.

Figure 3:
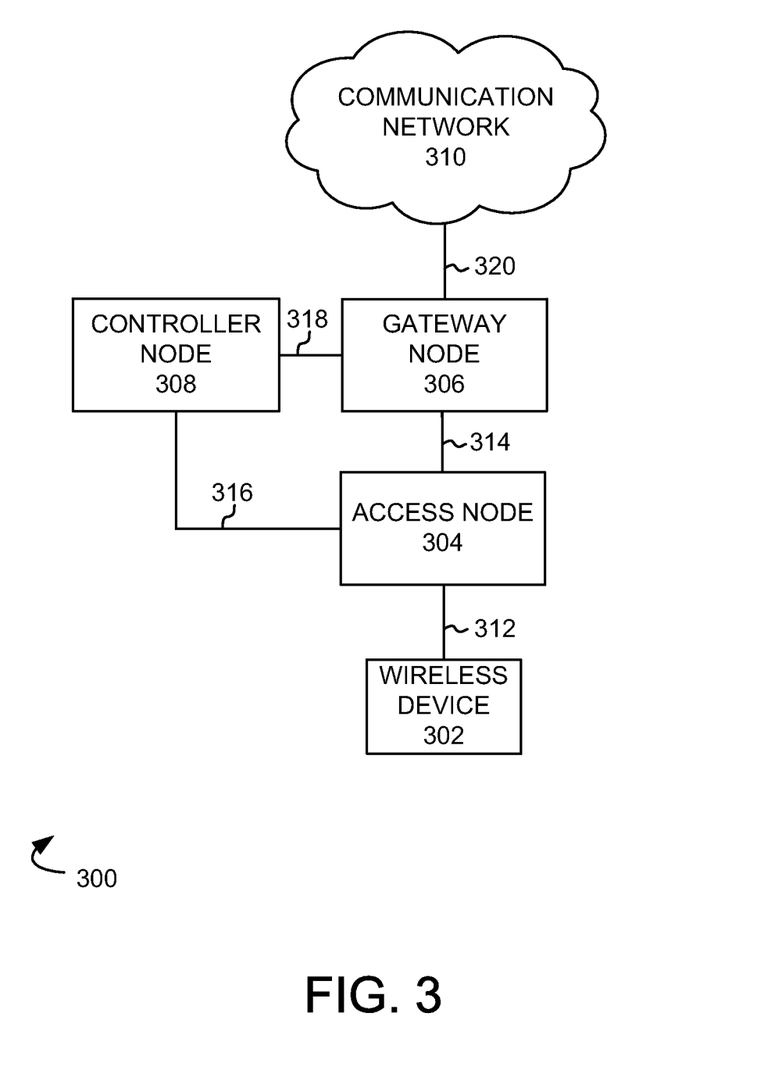
FIG. 3 illustrates another exemplary communication system to manage a handover of a wireless device.

FIG. 3 illustrates another exemplary communication system 300 to manage a handover of a wireless device comprising wireless device 302, access node 304, gateway node 306, controller node 308, and communication network 310. Examples of wireless device 302 can include a cell phone, a smart phone, a computing platform such as a laptop, palmtop, or tablet, a personal digital assistant, or an internet access device, including combinations thereof. Wireless device 302 is in communication with access node 304 over communication link 312.

Access node 304 is a network node capable of providing wireless communications to wireless device 302, and can be, for example, a base transceiver station, a radio base station, an eNodeB device, or an enhanced eNodeB device. Access node 302 is in communication with gateway node 306 over communication link 314, and with controller node 308 over communication link 316. Access node 304 and wireless device 302 can communicate over several frequency bands, including a higher frequency band and a lower frequency band.

Controller node 308 is a network element which can comprise a processor and associated circuitry to execute or direct the execution of computer-readable instructions. Controller node 308 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 308 can, among other things, provide instructions related to frequency band selection in communications with wireless device 302. Controller node 308 can also receive information from access node 304 and can issue instructions to access node 304 regarding communications with wireless device 302. Controller node 308 can be, for example, a standalone computing device or network element, such as a mobility management entity (MME), or the functionality of controller node 310 can be included in another network element.

Gateway node 306 is a network element which can comprise a processor and associated circuitry to execute or direct the execution of computer-readable instructions. Gateway node 306 is in communication with access node 304 over communication link 314 and with controller node 308 over communication link 318. Gateway node 306 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 306 can also provide instructions to access node 304 related to frequency band selection in communications with wireless device 302. Gateway node 306 can be for example, a standalone computing device or network element, or the functionality of controller node 310 can be included in another network element.

Communication network 310 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 310 may also comprise base stations, wireless communication nodes, telephony switches, internet routers, network gateways, computer systems, communication links, or some other type of communication equipment, and combinations thereof. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 310 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 312, 314, 316, 318 and 320 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 300 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access node 304, gateway node 306, controller node 308, and communication network 310 which are omitted for clarity, including additional processing nodes, routers, gateways, and physical and/or wireless data links for carrying data among the various network elements.

Figure 4:
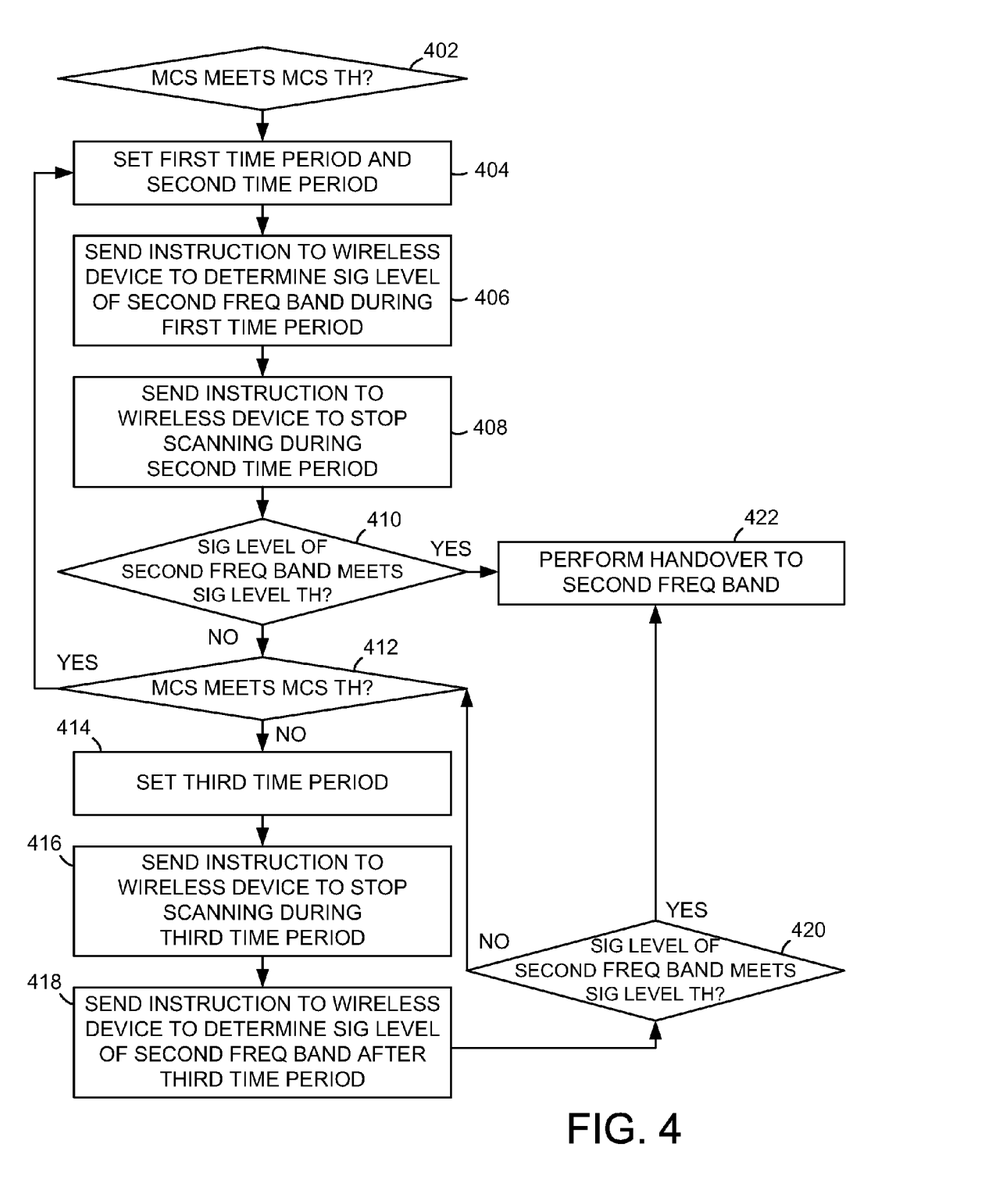
FIG. 4 illustrates another exemplary method of managing a handover of a wireless device.

FIG. 4 illustrates another exemplary method of managing a handover of a wireless device. In operation 402, it is determined that a modulation and coding scheme (MCS) assigned to a wireless device operating on a first frequency band meets an MCS threshold. For example, when wireless device 302, which is communicating with access node 304 over a higher frequency band moves beyond a coverage area of the higher frequency band but remains within a coverage area of a lower frequency band, a handover can be performed to instruct wireless device 302 to communicate over the lower frequency band. The performance of the handover can be triggered, for example, when a signal level of the higher frequency band drops to meet a threshold signal level, or when a signal level of the lower frequency band is greater than a signal level of the higher frequency band by a threshold amount, and so forth.

As wireless device 302 moves back toward the coverage area of the higher frequency band, wireless device 302 may be instructed to perform scanning of the higher frequency band to determine a signal level of the higher frequency band. Frequent scanning of the higher frequency band can reduce a data rate or a data throughput between access node 304 and wireless device 302 due at least in part to the frequent measurement periods assigned to wireless device 302, in which data is not sent to or received by wireless device 302. Further, frequent scanning of the higher frequency band can reduce battery power or another power storage of wireless device 302.

In an embodiment, it can be determined that an MCS assigned to a first frequency band on which a wireless device is operating meets the MCS threshold based on information provided by the wireless device to an access node. For example, wireless device 302 can provide to access node 304 periodic reports of wireless communication link conditions which it determines over the lower frequency band. The periodic reports can include a signal-to-noise ratio (SNR), signal-to-interference plus noise ratio (SINR), signal-to-noise plus distortion ratio (SNDR), and so forth, as well as a carrier quality indicator (CQI) or similar indicator of received signal quality. In an embodiment, one or more of the measurements made by wireless device 302 can be correlated with an MCS. For example, a range of SINR measurements can be correlated with an MCS of 16QAM, and based on the one or more measurements made by wireless device 302, it can be determined that an MCS assigned to a first frequency band on which a wireless device is operating meets the MCS threshold.

In operation 404, a first time period and a second time period are determined. Wireless device 302 can be instructed to scan the higher frequency band (e.g., determine a signal level of the higher frequency band) during the first time period and to not scan the higher frequency band during the second time period. In an embodiment, when wireless device 302 is instructed to perform scanning of the higher frequency band, wireless device 302 can further be instructed to determine signal level of the higher frequency band when the MCS meets the MCS threshold during the first time period.

In operation 406, an instruction is sent to the wireless device to determine a signal level of a second frequency band when the MCS meets the MCS threshold. For example, as wireless device 302 moves within the coverage area of the lower frequency band toward an edge of the coverage area of the higher frequency band, an MCS assigned to the communication between wireless device 302 and access node 304 can be monitored. In an embodiment, the assigned MCS can be monitored based on the what MCS access node 304 assigns to the communication between wireless device 302 and access node 304. In an embodiment, the assigned MCS can be monitored based on an indicator provided by wireless device 302, such as a signal level indicator, a signal quality indicator, and the like. For example, wireless device 302 can provide to access node 304 a carrier quality indicator (CQI) or similar indicator of received signal quality. The indicator can be based on, for example, a signal-to-noise ratio (SNR), signal-to-interference plus noise ratio (SINR), signal-to-noise plus distortion ratio (SNDR), and so forth of the high frequency band, which can be used to compute the CQI or similar indicator for the higher frequency band. The indicator for a given frequency band can also be based on the MCS assigned to the communication between wireless device 302 and access node 304.

In operation 408, a second instruction is sent to the wireless device instructing the wireless device to stop determining the signal level of the second frequency band when the MCS does not meet the MCS threshold. For example, when wireless device 302 is instructed to perform scanning of the higher frequency band, wireless device 302 can further be instructed to determine signal level of the higher frequency band when the MCS meets the MCS threshold during the first time period.

In operation 410, it is determined whether the signal level of the second frequency band meets the signal level threshold. When the signal level meets the signal level threshold (operation 410-YES), a handover is performed to instruct wireless device 304 to communicate over the higher frequency band (operation 422). When the signal level does not meet the signal level threshold (operation 410-NO), it is determined whether the MCS assigned to the communication between wireless device 302 and access node 304 meets an MCS threshold (operation 412).

For example, wireless device 302 may approach the edge of a coverage area of the higher frequency band, but the signal level of the higher frequency band may not be sufficient to support communications with access node 304. In such case, the MCS assigned to communications between access node 304 and wireless device 302 can be evaluated against the MCS threshold. When the MCS meets the MCS threshold (operation 412-YES), then the first and second time periods can be determined (operation 404) and the higher frequency band can be scanned during the first time period. When the MCS does not meet the MCS threshold (operation 412-NO), a third time period is set (operation 414), and an instruction is sent to the wireless device to not scan the higher frequency band during the third time period. By not scanning the higher frequency band during the third time period, wireless communication resources can be preserved, and additional scanning by the wireless device is prevented from negatively affecting a data rate or data throughput between wireless device 302 and access node 304. Further, power stored at wireless device 302 can be preserved.

In an embodiment, the first and/or second time periods may be adjusted. For example, based on a determined mobility of wireless device, the first time period may be lengthened and the second time period may be shortened, or vice versa. In one example, when it is determined that the signal level of the second frequency band does not meet the signal level threshold, a mobility of wireless device 302 can be determined. For example, it can be determined that wireless device 302 is located beyond the coverage area of the higher frequency band, and further that wireless device 302 is not moving toward access node 304 because it is relatively stationary, or because it has begun to move away from access node 304. In such case, the first and/or second time periods can be adjusted to scan the higher frequency band less frequently, either by reducing the first time period, increasing the second time period, or both.

As another example, when it is determined that the signal level of the second frequency band does not meet the signal level threshold, a battery power level or other power storage level of wireless device 302 can be determined. Based on the determined power storage level, such as when the determined power storage level of wireless device 302 meets a threshold, the first and/or second time periods can be adjusted to scan the higher frequency band less frequently, either by reducing the first time period, increasing the second time period, or both.

In operation 418, an instruction is sent to the wireless device to determine a signal level of the second frequency band. The instruction can be sent by access node 304 to wireless device 302 when the third time period ends. Alternatively, the instruction can be sent to wireless device 302 prior to the end of the third time period, indicating to wireless device 302 not to scan until the end of the third time period.

In operation 420, it is again determined whether the signal level of the second frequency band meets the signal level threshold. When the signal level meets the signal level threshold (operation 420-YES), a handover is performed to instruct wireless device 304 to communicate over the higher frequency band (operation 422). When the signal level does not meet the signal level threshold (operation 420-NO), it is again determined whether the MCS assigned to the communication between wireless device 302 and access node 304 meets an MCS threshold (operation 412).

Figure 5:
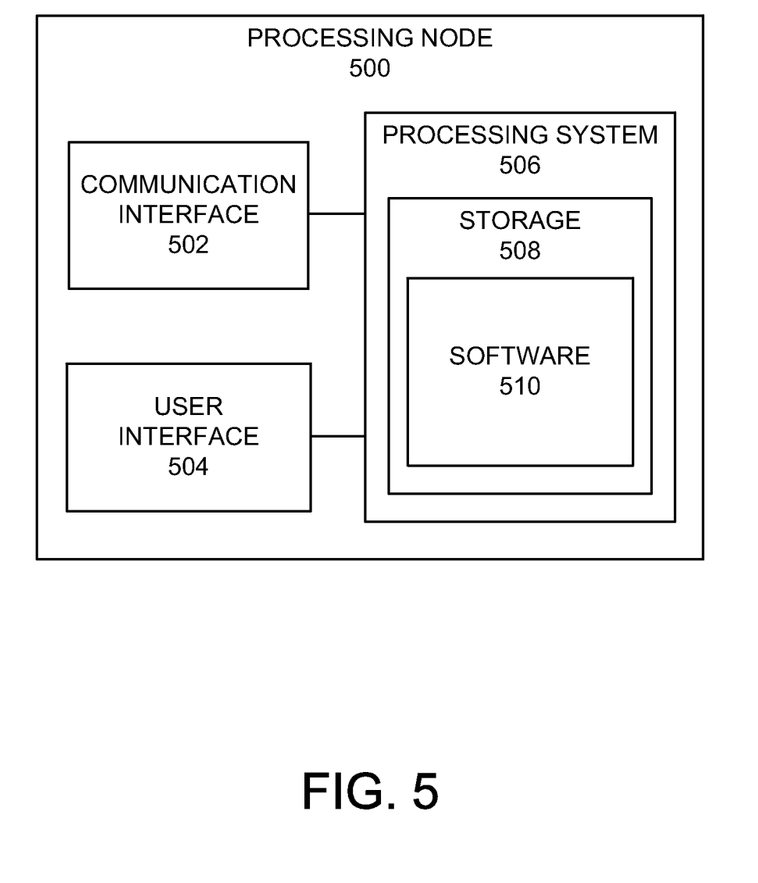
FIG. 5 illustrates an exemplary processing node.

FIG. 5 illustrates an exemplary processing node 500 in a communication system. Processing node 500 comprises communication interface 502, user interface 504, and processing system 506 in communication with communication interface 502 and user interface 504. Processing node 500 is capable of detecting unauthorized tethering by a wireless device. Processing system 506 includes storage 508, which can comprise a disk drive, flash drive, memory circuitry, or other memory device. Storage 508 can store software 510 which is used in the operation of the processing node 500. Storage 508 may include a disk drive, flash drive, data storage circuitry, or some other memory apparatus. Software 510 may include computer programs, firmware, or some other form of machine-readable instructions, including an operating system, utilities, drivers, network interfaces, applications, or some other type of software. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

Examples of processing node 500 include access node 104, access node 304, gateway node 306, and controller node 308. Processing node 500 can also comprise an adjunct or component of a network element, such as an element of access node 104 or access node 304. Processing node 500 can also be another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of managing a handover of a wireless device, comprising:
    determining that a modulation and coding scheme (MCS) assigned to a wireless device operating on a first frequency band exceeds an MCS threshold, wherein the first frequency band includes a coverage area that is greater than a coverage area of a second frequency band;
    instructing the wireless device to scan for a signal level of the second frequency band during an assigned measurement gap when the MCS exceeds the MCS threshold; and
    performing a handover of the wireless device from the first frequency band to the second frequency band when the signal level of the second frequency band meets a signal level threshold.

2. The method of claim 1, wherein during a second time period the wireless device does not scan for the signal level of the second frequency band.

3. The method of claim 1, further comprising determining that an MCS assigned to the first frequency band on which the wireless device is operating exceeds the MCS threshold based on information provided by the wireless device to an access node.

4. The method of claim 1, further comprising:
    sending a second instruction to the wireless device to stop scanning for the signal level of the second frequency band when the MCS does not exceed the MCS threshold.

5. The method of claim 1, further comprising:
    sending a second instruction to the wireless device to stop scanning for the signal level of the second frequency band for a third time period when the MCS does not exceed the MCS threshold; and
    sending a third instruction to the wireless device to scan for the signal level of the second frequency band when the third time period expires and the MCS exceeds the MCS threshold.

6. The method of claim 1, further comprising determining that the MCS assigned to the first frequency band on which the wireless device is operating exceeds the MCS threshold based on a signal level report about the first frequency band from the wireless device.

7. The method of claim 1, further comprising determining that the MCS assigned to the first frequency band on which the wireless device is operating exceeds the MCS threshold based on a signal level report about the first frequency band from the wireless device, wherein a signal level of the first frequency band is within a signal level range indicating the MCS assigned to the first frequency band.

8. The method of claim 1, wherein the first frequency band is lower frequency band carrier than the second frequency band.

9. A system of managing a handover of a wireless device, comprising:
    a processing node configured to
        determine that a modulation and coding scheme (MCS) assigned to a wireless device operating on a first frequency band meets an MCS threshold, wherein the first frequency band has a signal strength that is greater than a signal strength of the second frequency band;
        instruct the wireless device to determine a signal level of the second frequency band during an assigned first time period when the MCS meets the MCS threshold; and
        perform a handover of the wireless device from the first frequency band to the second frequency band when the signal level of the second frequency band meets a signal level threshold.

10. The system of claim 9, wherein the processing node is further configured to instruct the wireless device to not determine the signal level of the second frequency band during a second time period.

11. The system of claim 9, wherein the processing node is further configured to determine that the MCS assigned to the first frequency band on which the wireless device is operating meets the MCS threshold based on information provided by the wireless device to an access node.

12. The system of claim 9, wherein the processing node is further configured to send a second instruction to the wireless device to stop determining the signal level of the second frequency band when the MCS does not meet the MCS threshold.

13. The system of claim 9, wherein the processing node is further configured to:
- send a second instruction to the wireless device to stop determining the signal level of the second frequency band for a third time period when the MCS does not meet the MCS threshold; and
- send a third instruction to the wireless device to determine the signal level of the second frequency band when the third time period expires and the MCS meets the MCS threshold.

14. The system of claim 9, wherein the processing node is further configured to determine that the MCS assigned to a first frequency band on which a wireless device is operating meets the MCS threshold based on a signal level report about the first frequency band from the wireless device.

15. The system of claim 9, wherein the processing node is further configured to determine that the MCS assigned to the first frequency band on which the wireless device is operating meets the MCS threshold based on a signal level report about the first frequency band from the wireless device, wherein the signal level of the first frequency band is within a signal level range indicating the MCS assigned to the first frequency band.

16. The system of claim 9, wherein the first frequency band is a lower frequency band carrier than the second frequency band.

* * * * *